(12) United States Patent
Cotter

(10) Patent No.: US 12,481,422 B1
(45) Date of Patent: Nov. 25, 2025

(54) DEVICE INPUT FOR DIRECTING AN OBJECT

(71) Applicant: Fusion Holdings Limited, Douglas (IM)

(72) Inventor: Shane Cotter, Silema (MT)

(73) Assignee: Fusion Holdings Ltd., Douglas (IM)

( * ) Notice: Subject to any disclaimer, the term of this patent is extended or adjusted under 35 U.S.C. 154(b) by 0 days.

(21) Appl. No.: 18/673,725

(22) Filed: May 24, 2024

(51) Int. Cl.
  *G06F 3/0488* (2022.01)
  *G06T 19/00* (2011.01)

(52) U.S. Cl.
  CPC ............ *G06F 3/0488* (2013.01); *G06T 19/00* (2013.01)

(58) Field of Classification Search
  CPC ............... G06F 3/04883; G06F 3/0488; G06F 3/04886; G06F 2203/04808; G06F 3/017; G06F 2203/04104; G06F 3/0416; A63F 13/2145; A63F 13/42; A63F 13/40; A63F 2300/1075; A63F 13/92; A63F 13/211; A63F 13/214; A63F 2300/6045; A63F 13/812; A63F 2300/8011; A63F 2300/8082; A63F 2300/8076; A63F 13/573; A63F 13/837
  See application file for complete search history.

(56) References Cited

U.S. PATENT DOCUMENTS

| | | |
|---|---|---|
| 5,131,655 A | 7/1992 | Ugawa |
| 7,905,771 B2 | 3/2011 | Walker |
| 8,154,524 B2 * | 4/2012 | Wilson ............... A63F 13/57 345/173 |
| 8,956,220 B2 | 2/2015 | Melton |
| 9,286,766 B2 | 3/2016 | Igesund |
| 9,436,304 B1 * | 9/2016 | Leiba ................. G06F 3/04883 |
| 9,685,043 B2 | 6/2017 | Naicker |
| 10,269,220 B2 | 4/2019 | Harpur |
| 10,950,084 B2 | 3/2021 | Watkeys |

(Continued)

FOREIGN PATENT DOCUMENTS

WO  2023193971 A1  10/2023

OTHER PUBLICATIONS

Coin Flip—Heads or Tails, https://www.youtube.com/watch?v=Yo-35SKtnG4, Jun. 19, 2023.

(Continued)

*Primary Examiner* — Koosha Sharifi-Tafreshi
(74) *Attorney, Agent, or Firm* — McDonnell Boehnen Hulbert & Berghoff LLP

(57) ABSTRACT

A computing device is disclosed that includes an input component, a wireless communication module, a processor and a memory in communication with input component and the wireless communication module wherein the processor is configured to execute instructions for an application stored in the memory. The application includes stored instructions executable to detect a first input received by the input component, wherein the first input corresponds to a user movement, and determine at least one initial condition based on the detected first input. The application further includes stored instructions executable to communicate the at least one initial condition to a physics engine configured to reflect an object controlled by the input component, and determine a target location for the object based on an output provided by the physics engine.

17 Claims, 8 Drawing Sheets

(56) References Cited

U.S. PATENT DOCUMENTS

| | | |
|---|---|---|
| 11,354,971 B2 | 6/2022 | Tam |
| 11,577,162 B2 | 2/2023 | Slabbert |
| 11,651,653 B2 | 5/2023 | Ross |
| 11,669,594 B2 | 6/2023 | Gibb |
| 2003/0069055 A1 | 4/2003 | Moody |
| 2004/0107168 A1 | 6/2004 | Millner |
| 2005/0215304 A1 | 9/2005 | Moshal |
| 2006/0079331 A1 | 4/2006 | Moshal |
| 2006/0121968 A1 | 6/2006 | Daniel |
| 2006/0189381 A1 | 8/2006 | Daniel |
| 2006/0194628 A1 | 8/2006 | Novellie |
| 2006/0229949 A1 | 10/2006 | Moshal |
| 2006/0287097 A1 | 12/2006 | Moshal |
| 2007/0063443 A1 | 3/2007 | Moshal |
| 2007/0093297 A1 | 4/2007 | Moshal |
| 2007/0197282 A1 | 8/2007 | Moshal |
| 2007/0213121 A1 | 9/2007 | Moshal |
| 2007/0225057 A1 | 9/2007 | Moshal |
| 2008/0018049 A1 | 1/2008 | Hebden |
| 2008/0045288 A1 | 2/2008 | Moshal |
| 2008/0076501 A1 | 3/2008 | Mares |
| 2008/0090632 A1 | 4/2008 | Kumar |
| 2008/0090662 A1 | 4/2008 | Verardi |
| 2008/0176618 A1 | 7/2008 | Toompere |
| 2008/0214259 A1 | 9/2008 | Novellie |
| 2009/0023490 A1 | 1/2009 | Moshal |
| 2009/0093296 A1 | 4/2009 | Gerson |
| 2009/0098920 A1 | 4/2009 | Toompere |
| 2009/0124352 A1 | 5/2009 | Gerson |
| 2009/0286586 A1 | 11/2009 | Heymann |
| 2009/0318231 A1 | 12/2009 | Lange |
| 2009/0325688 A1 | 12/2009 | Naicker |
| 2010/0052255 A1 | 3/2010 | Naicker |
| 2010/0167808 A1 | 7/2010 | Moshal |
| 2010/0210362 A1 | 8/2010 | Toompere |
| 2011/0028202 A1 | 2/2011 | Naicker |
| 2012/0178518 A1 | 7/2012 | Moshal |
| 2013/0023324 A1 | 1/2013 | Lange |
| 2013/0085018 A1* | 4/2013 | Jensen ............... A63F 13/812 |
| | | 473/404 |
| 2013/0090164 A1 | 4/2013 | Moshal |
| 2013/0276101 A1 | 10/2013 | Rautenbach |
| 2013/0276102 A1 | 10/2013 | Rautenbach |
| 2013/0276103 A1 | 10/2013 | Rautenbach |
| 2013/0290178 A1 | 10/2013 | Masie |
| 2014/0149903 A1* | 5/2014 | Ahn ..................... G06F 3/0484 |
| | | 715/765 |
| 2014/0289107 A1 | 9/2014 | Moshal |
| 2014/0310117 A1 | 10/2014 | Moshal |
| 2015/0119129 A1 | 4/2015 | Igesund |
| 2015/0126264 A1 | 5/2015 | Igesund |
| 2015/0141115 A1 | 5/2015 | Vermaak |
| 2015/0170460 A1 | 6/2015 | Marais |
| 2015/0221162 A1 | 8/2015 | Peters |
| 2015/0248811 A1 | 9/2015 | Wortmann |
| 2015/0324777 A1 | 11/2015 | Moshal |
| 2016/0074753 A1* | 3/2016 | Frostberg ............... A63F 13/57 |
| | | 463/31 |
| 2016/0203671 A1 | 7/2016 | Vermaak |
| 2017/0046704 A1 | 2/2017 | Büchner |
| 2017/0213416 A1 | 7/2017 | Wortmann |
| 2018/0101237 A1* | 4/2018 | Lu ....................... G06F 3/0304 |
| 2018/0122184 A1 | 5/2018 | Wortmann |
| 2018/0122189 A1 | 5/2018 | Wortmann |
| 2018/0349871 A1 | 12/2018 | Moshal |
| 2019/0005473 A1 | 1/2019 | De Villiers |
| 2019/0220834 A1 | 7/2019 | Moshal |
| 2020/0312085 A1 | 10/2020 | Rottcher |
| 2021/0034997 A1 | 2/2021 | Harpur |
| 2022/0005018 A1 | 1/2022 | White |
| 2022/0143505 A1 | 5/2022 | Mathieson |
| 2022/0197597 A1 | 6/2022 | Harpur |
| 2023/0035443 A1 | 2/2023 | Harpur |
| 2023/0162559 A1 | 5/2023 | Harpur |
| 2023/0315819 A1 | 10/2023 | Guy |
| 2023/0334611 A1 | 10/2023 | Pimienta |

OTHER PUBLICATIONS

Coin Flip Game in Apple Store, https://apps.apple.com/us/app/coin-flip/id1382401145, 2018.

Crazy Coin Flip Tutorial, https://www.youtube.com/watch?v=Kfe8BYj_vUA, Jun. 29, 2022.

U.S. Mint Coin Flip Game, https://www.usmint.gov/learn/kids/games/coin-flip, last accessed May 24, 2024.

* cited by examiner

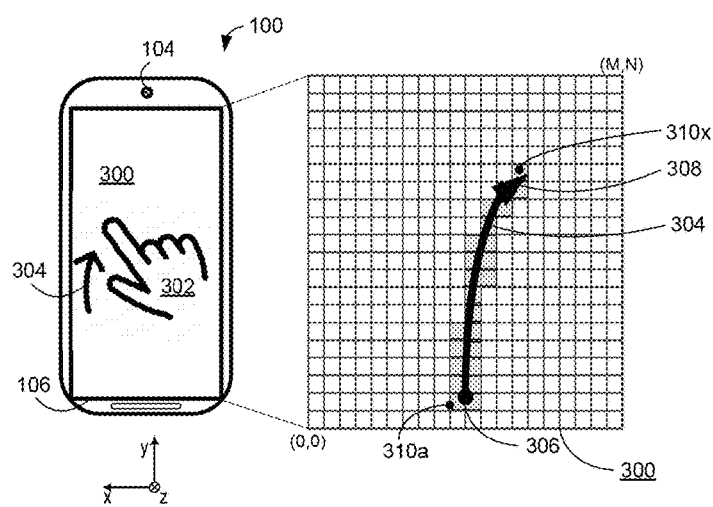
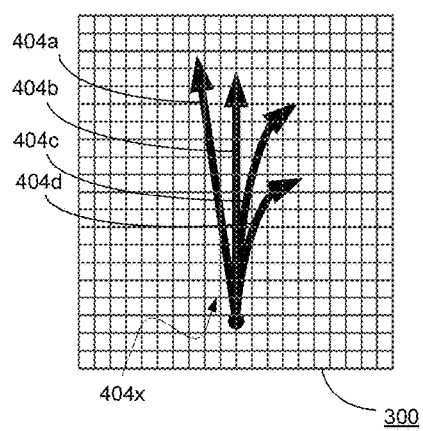
Figure 3
Figure 4

DEVICE INPUT FOR DIRECTING AN OBJECT

BACKGROUND

Many modern computing devices, including mobile phones, personal computers, and tablets include hardware and applications to facilitate receiving an input from a user and utilizing the information provided as part of the input to direct or control an object. Computing devices incorporate a wide array of interface, controls, and mechanisms to provide and detect the input. But, controlling the movement of an object in a physical or digital environment can be challenging with the hardware and applications available on the computing devices. Furthermore, current systems involve trial-and-error on the part of the user, wasting time and computing resources that could be put to other productive uses.

SUMMARY

The embodiments herein provide a mechanism by which an input may be detected and provided to a physics engine configured to represent a controllable body. In operation, the input may be a user input detected at, for example, a touchscreen portion of a computing device. The detected user input corresponds to a user movement to be imparted upon the controllable body. The user input may be analyzed to determine at least one initial condition. The at least one initial condition may include an X-component, a Y-component, a duration, and/or a vector. The at least one initial condition may, in turn, be provided to a physics engine configured to replicate the physical characteristics and performance of an object which generates a target location for the object. By accurately capturing the user input and employing a physics engine, location, movement, orientation, attitude, and other factors of the object may be more accurately represented. As a consequence, computing resource usage is reduced as fewer attempts are needed to obtain a desired result involving the object.

Accordingly, a first example embodiment a mobile computing device is disclosed. The mobile computing device includes an input component, a wireless communication module, and a processor and a memory in communication with input component and the wireless communication module. The processor is configured to execute instructions for an application stored in the memory, the application includes stored instructions executable to detect a first input received by the input component, wherein the first input corresponds to a user movement; determine at least one initial condition based on the detected first input; communicate the at least one initial condition to a physics engine configured to reflect an object controlled by the input component; and determine a target location for the object based on an output provided by the physics engine.

In some examples, the input component is at least one of a touchscreen, a control stick, and one or more accelerometers.

In some examples, the wireless communication module is configured for at least one of: wi-fi communication, peer-to-peer communication, and cellular communication.

In some examples, the at least one initial condition includes: an X-component, a Y-component, a duration, and a vector.

In some examples, the object is a drone in communication with the wireless communication module.

In some examples, the object is a digital object displayed within a touchscreen of the input component, and wherein the object is configured as part of the physics engine.

In some additional examples, the target location includes a first target location and a second target location.

In some additional examples, the output provided by the physics engine is adjusted by a perturbation that reflects either the first target location or the second target location.

In some additional examples, the first target location is at a first height, and the second target location is at a second height, and wherein the first height is lower than the second height.

In some additional examples, a magnitude of the perturbation increases based on the distance between the first target location, and the second target location.

In some additional examples, the first target location is associated with a first probability and the second target location is associated with a second probability.

In some examples, determining at the least one initial condition based on the detected first input reflects matching the first input to one of a plurality one initial condition maintained as part of the application.

In some examples, the instructions stored as part of the application are executed continuously to provide an updated output.

In a second example embodiment, a computing system is disclosed. The computing system includes an input component, a wireless communication module, one or more processors, and memory storing instructions for an application that are executable by the one or more processors. The stored instructions perform operations including detecting a first input received by the input component, wherein the first input corresponds to a user movement; determining at least one initial condition based on the detected first input; communicating the at least one initial condition to a physics engine configured to reflect an object controlled by the input component; and determining a target location for the object based on an output provided by the physics engine.

In some examples, the object is a digital object displayed within a touchscreen of the input component, and wherein the object is configured as part of the physics engine.

In some additional examples, the target location includes a first target location and a second target location.

In some additional examples, the output provided by the physics engine is adjusted by a perturbation that reflects either the first target location or the second target location.

In a third example embodiment, a non-transitory computer-readable medium storing program instructions for an application that, when executed by one or more processors of a computing system, cause the computing system to perform operations. The operations include detecting a first input received by an input component, wherein the first input corresponds to a user movement; determining at least one initial condition based on the detected first input; communicating the at least one initial condition to a physics engine configured to reflect an object controlled by the input component; and determining a target location for the object based on an output provided by the physics engine.

In some examples, the object is a digital object displayed within a touchscreen of the input component, and wherein the object is configured as part of the physics engine.

In some additional examples, the target location includes a first target location and a second target location.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 3 is an example of an input component configured to capture input conditions.

FIG. 4 is an example of implementing multiple captures reflecting input conditions.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Herein, a "software application" or "application" may be any structured set of computer-executable instructions that can to perform a specific function or a set of related functions. This encompasses programs that operate in various computing environments, including but not limited to standalone desktop applications, mobile applications, web-based applications, embedded systems software, cloud-based services, distributed computing applications, and operating systems. Software applications may involve the processing, manipulation, and management of data, control of hardware devices, execution of various algorithms, provisioning of user interfaces for interaction, and communication with other software applications or services. The term is inclusive of software that performs an array of functions, whether pre-installed, downloaded, accessed remotely, or delivered as a service. This definition is intended to cover a broad range of software implementations, architectures, and platforms, recognizing the evolving nature of technology and software development practices.

I. EXAMPLE COMPUTING DEVICES AND COMPUTING ENVIRONMENTS

Figure 1:
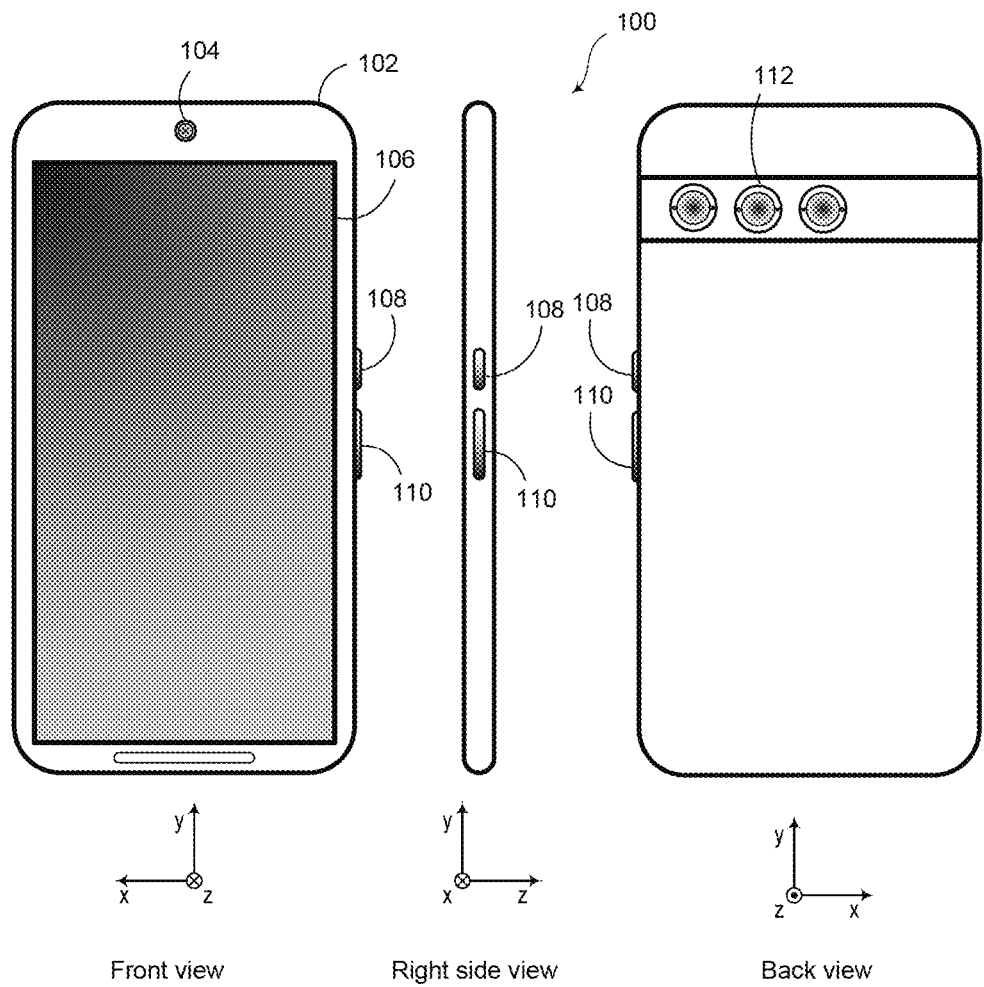
FIG. 1 illustrates an example computing device, in accordance with example embodiments.

FIG. 1 illustrates an example computing device 100. The example computing device 100 shown in FIG. 1 is arranged in the form factor of a mobile computing device such as a mobile phone. However, computing device 100 may be alternatively implemented as a laptop computer, a tablet computer, and/or a wearable computing device such as a health tracking device, or a smart watch. Computing device 100 may include various elements, such as body 102, display 106, and buttons 108 and 110. Computing device 100 may further include one or more cameras, such as front-facing camera 104 and one or more rear-facing cameras 112. Each of the rear-facing cameras may have a different field of view. For example, the rear facing cameras may include a wide angle camera, a main camera, and a telephoto camera. The wide angle camera may capture a larger portion of the environment compared to the main camera and the telephoto camera, and the telephoto camera may capture more detailed images of a smaller portion of the environment compared to the main camera and the wide angle camera.

Front-facing camera 104 may be positioned on a side of body 102 typically facing a user while in operation (e.g., on the same side as display 106). Rear-facing camera 112 may be positioned on a side of body 102 opposite front-facing camera 104. Referring to the cameras as front and rear facing is arbitrary, and computing device 100 may include multiple cameras positioned on various sides of body 102.

Display 106 could represent a cathode ray tube (CRT) display, a light emitting diode (LED) display, a liquid crystal (LCD) display, a plasma display, an organic light emitting diode (OLED) display, or any other type of display. The object displayed may be, for example, from an application executing on the computing device 100, a current image being captured by front-facing camera 104 and/or rear-facing camera 112, an image that could be captured by one or more of these cameras, an image that was recently captured by one or more of these cameras, and/or a modified version of one or more of these images.

Display 106 may a touchscreen that incorporates a touch sensitive-panel and functionality that may be able to adjust the settings and/or configuration of one or more aspects of computing device 100. The touch sensitive-panel and functionality incorporated into the touchscreen of display 106 may be configured to recognize input gestures based on, for example, the number of digits (e.g., fingers) in contact with the touchscreen, the type of action detected, the direction of the action detected. In another example, the touch sensitive-panel functionality and/or the front-facing camera 104 of the display 106 may be configured to recognize movements and gestures of a user. For example, hands and finger movement may be captured by the front-facing camera 104 in an area adjacent to the touchscreen.

Figure 2:
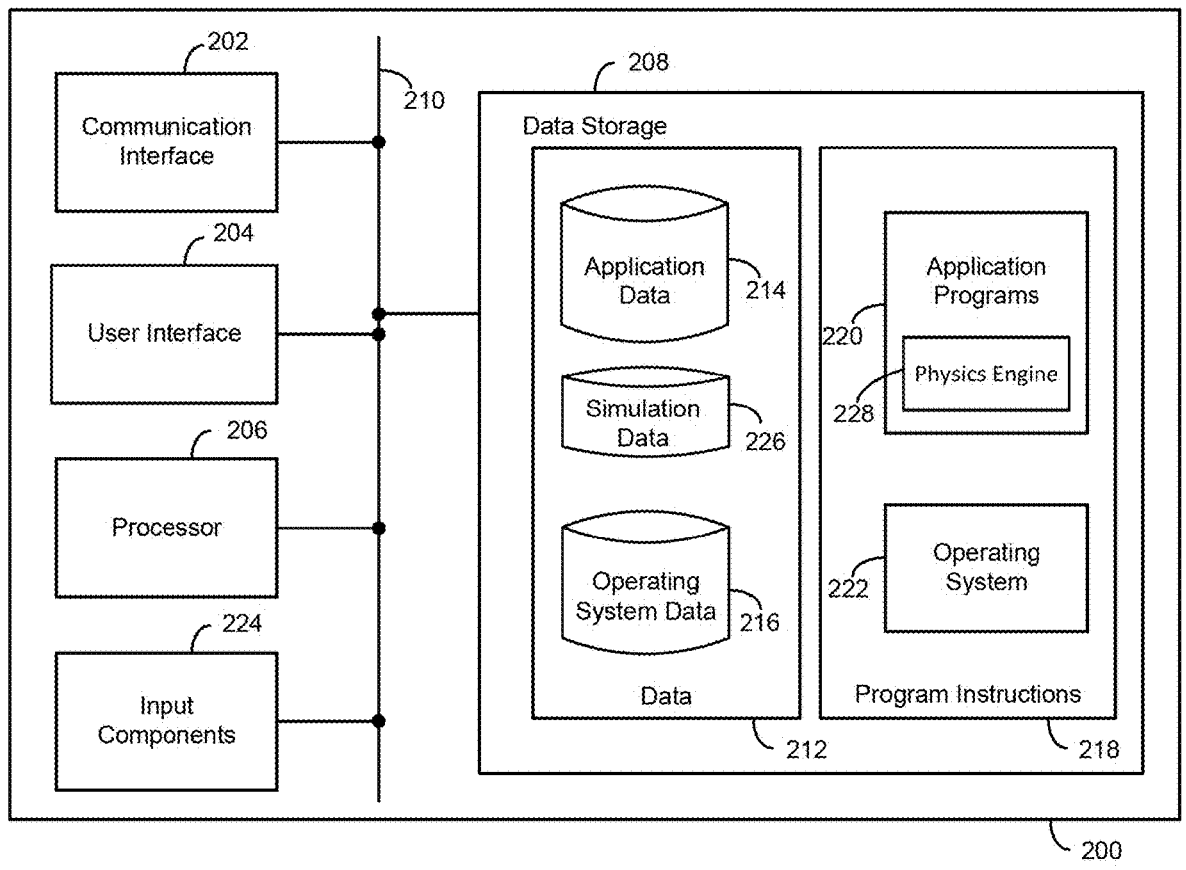
FIG. 2 is a simplified block diagram showing exemplary components for a computing system.

FIG. 2 is a simplified block diagram showing some of the components of an example computing system 200. By way of example and without limitation, computing system 200 may be a mobile device (e.g., a smartphone), a computer (such as a desktop, notebook, tablet, server, or handheld computer), a home automation component, a digital video recorder (DVR), a digital television, a remote control, a wearable computing device, an entertainment console, a robotic device, a vehicle, or some other type of device. Computing system 200 may represent, for example, aspects of the mobile computing device 100.

As shown in FIG. 2, computing system 200 may include communication interface 202, user interface 204, processor 206, data storage 208, and input components 224, all of which may be communicatively linked together by a system bus, network, or other connection mechanism 210. In some cases, computing system 200 may be equipped with at least some short-range communication capabilities.

The communication interface 202 may allow the computing system 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point.

The communication interface 202 may further include a wireline interface, such as an Ethernet, Universal Serial Bus (USB), or High-Definition Multimedia Interface (HDMI) port, among other possibilities. The communication interface 202 may also take the form of or include a wireless interface, such as a Wi-Fi, BLUETOOTH®, global positioning system (GPS), or wide-area wireless interface (e.g., to communicate with a 4G or 5G network), among other possibilities. However, other forms of physical layer interfaces and other types of standard or proprietary communication protocols may be used over communication interface 202. Furthermore, communication interface 202 may be a wireless communication module configured to include multiple physical communication interfaces (e.g., a Wi-Fi interface, a BLUETOOTH® interface, and a wide-area wireless interface). In other configurations, the wireless communication module may cooperate with a wired communication module including multiple wired interfaces to provide a range of network access options and capabilities.

User interface 204 may function to allow computing system 200 to interact with a human or non-human user, such as to receive input from a user and to provide output to the user. Thus, user interface 204 may include input components such as a keypad, keyboard, touch-sensitive panel, a fingerprint scanner, one or more accelerometers, computer trackpad, computer mouse, joystick, microphone, and so on. User interface 204 may also include one or more output components such as the display 106, which, for example, may be combined with a touch-sensitive panel. The display may be based on CRT, LCD, LED, and/or OLED technologies, or other technologies now known or later developed. User interface 204 may generate controls and visual elements for presentation on the display 106. In an example operation, the user interface 204 may detect a user interaction with the touch-sensitive panel incorporated into display 106, and identify a corresponding control and/or visual element as a way of gathering information from the user. User interface 204 may further be configured to generate audible output(s), via a speaker, speaker jack, audio output port, audio output device, earphones, and/or other similar devices. User interface 204 may also be configured to receive and/or capture audible utterance(s), noise(s), and/or signal(s) by way of a microphone and/or other similar devices. In this way, information may be presented and received via the user interface 204.

In some examples, a control presented by the user interface 204 may serve as a viewfinder for a camera such front-facing camera 104 and/or rear-facing camera 112 and provide access to camera functions supported by computing system 200. In some examples, the user interface 204 may include a display to capture fingerprint information using the touch-sensitive panel. In another example, the user interface 204 may cooperate with the front-facing camera 104 to train and capture a facial gesture directed to the front-facing camera 104 and provided to the display 106 for review. In another example, the user interface 204 may include a touch-sensitive panel and be configured to identify and distinguish a user gesture provided to the touch-sensitive panel. Additionally, user interface 204 may include one or more controls and elements such as graphical buttons, switches, knobs, and/or dials that facilitate the interaction with the stored functionality as described herein. It may be possible that some or all of the controls such as buttons, switches, knobs, and/or dials are implemented by way of the touch-sensitive panel and the display 106.

Processor 206 may comprise one or more general purpose processors—e.g., microprocessors—and/or one or more special purpose processors—e.g., digital signal processors (DSPs), graphics processing units (GPUs), floating point units (FPUs), tensor processing units (TPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components, and may include read-only memory (ROM), random access memory (RAM), register memory within a processor, or long term storage such as a hard disk drive (HDD) or a solid state drive (SSD).

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing system 200, cause computing system 200 to carry out any of the methods, processes, or operations disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, audio-to-text functions, text translation functions, and/or entertainment applications) installed on computing system 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing system 200. Data 212 may further include simulation data 226. Simulation data 226 may be stored as part of the operating system data 216, or the application data 214. In another example, the simulation data 226 may be physically isolated storage, logically partitioned storage, or otherwise additionally stored for access by a dedicated application stored as part of the application data 214 or the application programs 220.

Application programs 220 may communicate with operating system 222 through one or more application programming interfaces (APIs). These APIs may facilitate, for instance, application programs 220 reading and/or writing application data 214 or the simulation data 226, transmitting or receiving information via communication interface 202, receiving and/or displaying information on user interface 204, and so on. Additionally, application programs 220 may be downloadable to computing system 200 through one or more online application stores or application markets. However, application programs 220 can also be installed on computing system 200 in other ways, such as via a web browser or through a physical interface (e.g., a USB port) on computing system 200.

In some cases, application programs 220 may be referred to as "apps" for short. One example application may be a physics engine 228 which may operate in conjunction with the simulation data 226. In operation, one or more of the application programs 220 may access the physics engine 228 and the simulation data 226 based on an input provided via the user interface 204. The physics engine 228 is configured to calculate and apply real-world physics interactions in a virtual environment such that gravity, collisions, friction, and other forces that affect the motion and behavior of objects.

For example, the physics engine 228 may further includes one or more software components to simulate real-world physical phenomena within a virtual environment. Some functionality that may be provided by the physics engine 228 may include the simulation of rigid body dynamics, which allows for realistic object interactions and collisions, soft body dynamics for more flexible and deformable objects, and particle systems that enable the simulation of effects like fire, smoke, or explosions. Additionally, the physics engine 228 may incorporate real-time fluid dynamics, handling the movement and interaction of liquids and gases. In some examples, the physics engine 228 may support the application of forces, torques, and constraints, which can be used to create believable motion and behaviors for virtual objects. In some examples, the physics engine 228 may be based on the Unity or Unreal physics engines or some other type of physics engine.

During operations, one or more application may utilize the input components 224, such as the touchscreen integrated into the display 106, one or more cameras such as the front facing camera 104, to detect a user input. Additional input components include the buttons 108 and 110 including any controls, toggles, or switches provided in the body 102. Input components 224 may include components configured to determine the device orientation based on one or more accelerometers and/or gyroscopes positioned within the body 102. In some examples, input component 224 may be the front facing camera 104 either alone or in combination with a light detection and ranging (LiDAR) sensor providing three-dimension (3D) coordinate and depth information of a target such as a user's hands, fingertips, and may include facial recognition and expressions. Input components 224 may be controlled at least in part by the operating system 222 as executed by processor 206.

FIG. 3 illustrates an input component such as an example touchscreen 300 provided as part of the display 106 incorporated into the computing device 100 and configured to capture input conditions. The touchscreen 300 may incorporate one or more sensing technologies based on the requirements of the computing device 100. In one example, the touchscreen 300 may include resistive sensing that includes two flexible sheets coated with a resistive material and separated by a small gap such that when a first layer is touched by a user, the first layer makes contact with the second layer at the point of contact causing a change in the electrical current. The touchscreen 300 may then calculate the coordinates (X-component, and Y-component) and duration of the touch based on the change in current. In one example, the touchscreen 300 may include capacitive sensing includes a layer of capacitive material (such as indium tin oxide) to store an electrical charge that is disrupted when a finger conducts and disrupts the electrical field. The resulting change in capacitance may detected by the touchscreen 300 allowing the coordinates (X-component, and Y-component) and duration of the touch to be determined. In some examples, the touch screen 300 may incorporate Surface Acoustic Wave (SAW) technology and/or infrared sensing technology. In other examples, the front facing camera 104 may be employed to identify features of a user within a predefined space with respect to the computing device 100. For example, the front facing camera 104 may identify and track a user's fingertips within a space defined above the display 106. The specific location(s) of a user's fingertips may similarly be utilized to calculate the coordinates (X-component, and Y-component) and assign a duration of the movement based on images and information captured via repeated imaged from front facing camera 104.

As further shown in FIG. 3, the touchscreen 300 may be a 20×20 array of sensors formed as part of the display 106. It will be understood that the sensor array formed as part of the touchscreen 300 may be an M×N array such as a 32×32 array, 64×64 array, 64×128 array, or an array of different dimension. It will be understood that as the number of array elements M increases and the number of array element N increases, the specific location of an input 304 corresponding to user's fingertip 302 may identified with increased precision. For example, the touchscreen 300 may detect an initial point or origin 306 of the input 304 and an endpoint or target 308 of the input 304. The touchscreen 300 may detect the input 304 using one or more of the array elements 310. For example, array elements 310a-310x may be activated as the user's fingertip 302 passes over the surface of the display 106 (i.e., in a "swipe" motion). The activated array elements 310a-310x are visually identified with shading. Each of the array elements 310a-310x correspond to a X-location, and a Y-location on the touchscreen 300 and the display 106. The combination of each of the X and Y locations for the array elements 310a-310x may be utilized to plot a path or a course that reflects the input 304. The path or course may be determined by curve fitting, such as a least-squares regression, an interpolation, and/or a direct plot of the X and Y locations for the array elements 310a-310x. Each of the array elements 310a-310x upon activation may record the duration of that activation. In some examples, duration may be utilized to reflect the pressure or force applied to one or more of the array elements 310a-310x. In some examples, each of the array elements 310a-310x may be a pressure sensitive element to directly measure the applied force and/or pressure.

FIG. 4 illustrates the example touchscreen 300 provided as part of the display 106 and implementing multiple captures reflecting input conditions. For example, the touchscreen 300 displays multiple potential inputs 404a-404d which may provide different timing and location profiles. In some embodiments, a plurality of potential inputs 404x reflecting each possible input condition, timing and location profile may be collectively identified as the simulation data 226. The simulation data 226 may be provided to the physics engine 228 configured to apply physical constraints to one or more objects. In some embodiments, the output of the physics engine 228 may be included as part of the simulation data. For example, the output of the physics engine 228 may reflect the initial conditions including the X and Y components, a force and a vector to be applied to the object for each of the plurality of potential inputs 404x. The simulation data 226 and the corresponding outputs of the physics engine 228 may be stored as part of the data 212 and accessible to the application 220.

II. EXAMPLE CAPTURE AND COMMUNICATION OF INPUT CONDITIONS TO A DRONE

Figure 5:
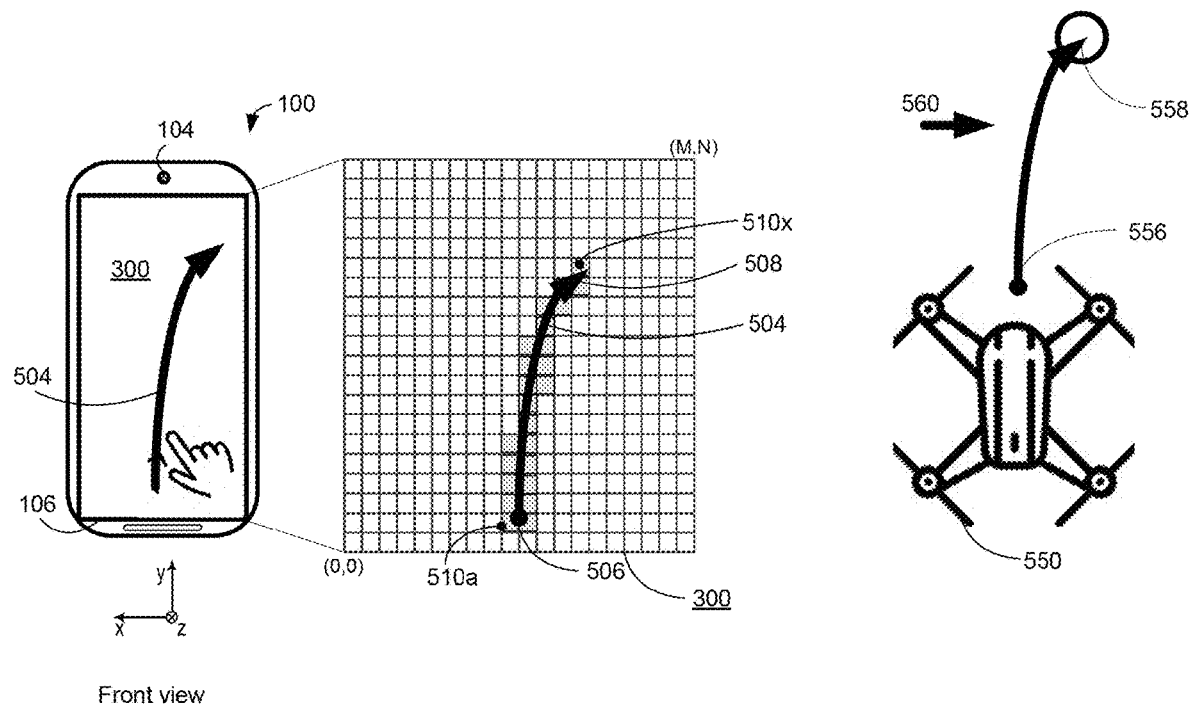
FIG. 5 is an example embodiment of the input component configured to capture input conditions for presentation to a drone.

FIG. 5 illustrates an example embodiment of the computing device 100 configured to capture input conditions for analysis and communication to an object in communication with the communication interface 202. For example, the touchscreen 300 may detect an input 504 of a user's finger 302 identifying an initial point or origin 506 corresponding to an array elements 510a-510x activated and including the target 508. As previously, described, the activated array elements 510a-510x are visually identified with shading. The combination of each of the X and Y locations for the array elements 510a-510x, the duration of contact, and any other collected information may be utilized to plot a path or a course that reflects the input 504. The resulting information may be stored as part of the simulation data 226. Similarly, the resulting information may be provided to the physics engine 228 configured to apply physical constraints to one or more objects. For example, the object may include the physical characteristics and restraints of a drone 550. The physics engine 228 may calculate the behavior of drone 550 based on physical characteristics and restraints. Accordingly, the initial conditions provided by the input 504 may be convert to a course or trajectory of the drone 550 being the initial point 556 to a target 558.

In some examples, a perturbation 560 such as wind, air pressure, and humidity may be provided to the computing device 100 and utilized by the physics engine 228. In some examples, the accuracy and/or reliability of arriving at the desired target 558 may be influence by the distance travelled by the drone 550. Accordingly, a target 558 at a first position closer to the drone 550 may be accurately identified than the target 558 at a second position that is farther than the first position. In some examples, the physics engine 228 may attempt to correct or compensate for the perturbation 560.

In general, the path, angle, pressure, and speed of a swipe on a touchscreen can be converted into control instructions for the drone that impact its throttle (for altitude), pitch (for forward and backward movement), roll (for side-to-side movement), and/or yaw (for rotational movement). The path of the swipe (the trajectory that the user's finger follows across the touchscreen) may determine the direction of the drone's movement (forward, backward, left, or right). The angle of the swipe can be used to refine these commands, allowing for diagonal movements or more nuanced steering controls (e.g., a swipe at a 45-degree angle might result in the drone moving forward and to the right simultaneously). The speed at which the swipe is made can also inform the drone's behavior. A quick swipe could be interpreted as a command for a rapid movement, while a slow swipe might indicate a more gradual maneuver. This is particularly useful for controlling acceleration or deceleration. The pressure of the swipe can be used to control the altitude or speed of the drone. A harder press might increase the drone's speed or cause it to rise higher, while a lighter touch could reduce speed or lower altitude.

Information from the swipe as well as the drone's current operating conditions and setting can be formulated into specific commands for the drone (e.g., "rotate right by 27 degrees" or "move forward at 0.1 meters per second"). These commands may be transmitted to the drone via various communication techniques such as WiFi or BLUETOOTH®.

III. EXAMPLE CAPTURE AND COMMUNICATION OF INPUT CONDITIONS TO A DIGITAL OBJECT

FIGS. 6A-6F illustrate examples of the computing device 100 configured to capture input conditions for analysis and communication to a digital object presented in the touchscreen 300. For example, the digital object may be a coin that can be flipped by way of an input provided to the touchscreen 300 of a computing device such as a mobile phone. As illustrated in FIGS. 6A-6F and 7, the digital object may be a coin having a heads or a tails and when flipped by the user one of those sides is facing upwards. For example, the input received from the user may provide the basis for initial conditions to be imparted to the digital object. The input provided by the user via the touchscreen 300 such that an input determined to be a gentle input (e.g., the input 404d) may result in the digital coin being flipped to a lower level relative to an input determined to be an aggressive input (e.g., the input 404b). In other words, the force and vector determined as part of an input from the user may be imparted to the digital object such that the movement of the digital object in accordance with these parameters. For example, the physics engine 228 utilizes the initial conditions and the physical characteristics of the digital coin to calculate the behavior of body based on physical principles like gravity, collisions, friction, and other forces that affect the motion and behavior of the object.

In some examples, the interaction with the digital coin may be initiated by a tap on the touchscreen 300 or a button 108. In some examples, an application 220 may be a game based on flipping the digital coin. In some examples, a basic premise of the game may allow the user to make a 50/50 wager on the outcome of a coin flip. A correct prediction of heads or tails within the application 220 returns to the user double their original wager (e.g., a wager of $1, get back $2, being the original wager plus an additional 100% of the originally placed wager). An incorrect prediction may result in the user losing the original wager. Various return-to-player (RTP) amounts can be employed by modifying the payout with respect to the original wager, as well as the probability of obtaining such a payout, so that the expected payout over time is known (e.g., an RTP of 95% means that the user can expect 95 cents returned for every dollar wagered).

Figure 6A:
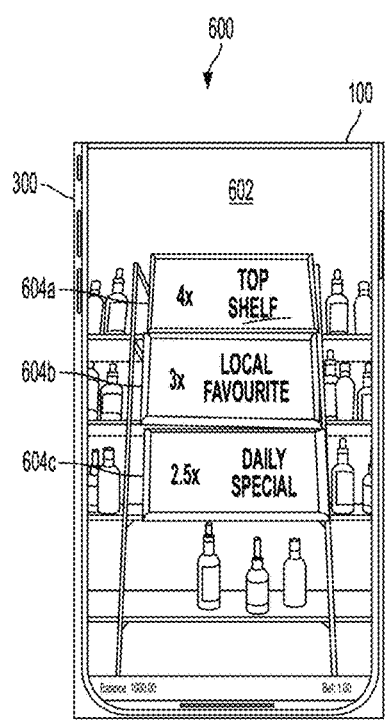
FIGS. 6A, 6B, 6C, 6D, 6E, and 6F are an example embodiment of an application configured to capture input conditions for presentation to a digital object.

FIGS. 6A-6F illustrate an example a coin flip application 220 that may be implemented as part of the computing device 100. FIG. 6A illustrates the computing device 100 as a mobile computing device including an input device such as the touchscreen 300. The mobile computing device may further include a wireless communication module to allow for multiplayer options and access to additional network resources, and a processor and a memory in communication with input component and the wireless communication module wherein the processor is configured to execute instructions for an application stored in the memory.

FIG. 6A further illustrates a coin flip application 600 displayed as part of the touchscreen 300 portion of the display 106. The coin flip application 600 includes a game space 602 having multiple heights or levels 604a, 604b, and 604c arranged at different distances and/or heights relative to a digital coin 610. The coin flip application 600 includes stored instructions executable to detect a first input received by the input component, wherein the first input corresponds to a user movement, and determine at least one initial condition based on the detected first input. The coin flip application 600 further includes stored instructions executable to communicate the at least one initial condition to a physics engine configured to reflect an object controlled by the input component; and determine a target location for the object based on an output provided by the physics engine.

The coin flip application 600 may, for example, require a user to guess what side of the digital coin (e.g., heads or tails) the coin will land, while at the same time attempting to ensure that the coin lands at a desired location. Similarly, flipping the digital coin via an input provided to the touchscreen 300 may incorporate additional variability when flipping the digital coin over a distance, or when flipping the digital coin at varying heights.

Figure 6B:
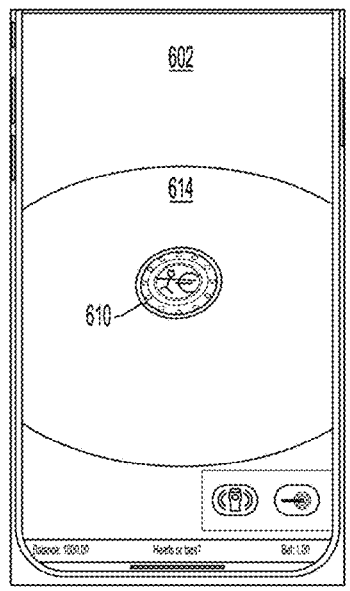
Figure 6C:
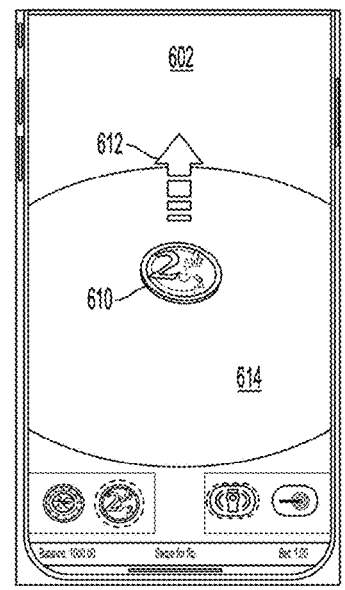

FIGS. 6B-6C illustrate the coin flip application 600 detecting a first input relative to the digital coin 610 displayed as part of the touchscreen 300. The detected first input reflects the movement of a user's finger relative to the touchscreen 300. FIG. 6C illustrates that initial conditions 612 may be determined based on the movement of the user's finger relative to the touchscreen 300. For example, the initial conditions may reflect an X-component and a Y-component of the movement as well as duration and/or pressure information related to the movement. In one implementation of the coin flip application 600, a user may place a wager of one dollar ($1) that the digital coin 610 may land on either heads or tails. Additionally, in order to receive a payout equal to the wager, the coin flip application 600 may require that the digital coin 610 must land within the target area 614.

Figure 6D:
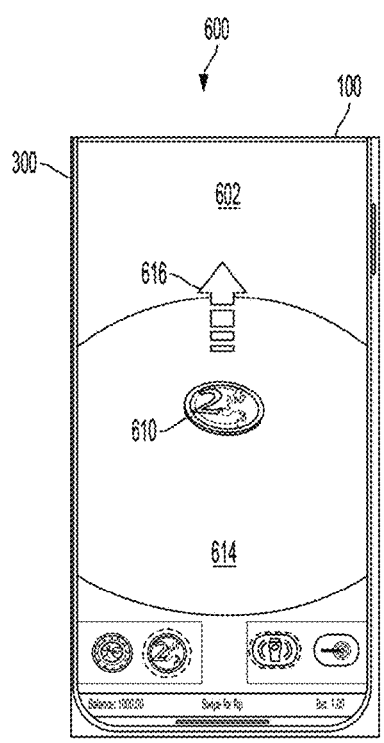
Figure 6E:
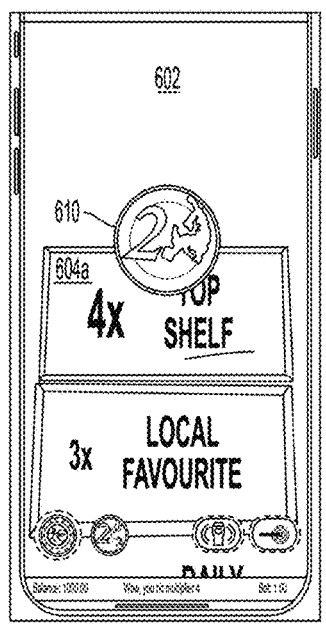
Figure 6F:
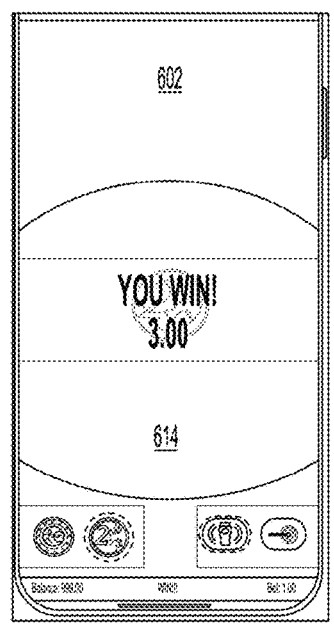

FIGS. 6D-6F further illustrate the coin flip application 600 once the initial conditions have been passed to the physics engine 228 configured to reflect the object 610 which in this case has the physical characteristics of a metallic coin. The physics engine 228 utilizes the initial conditions to predict the motion of the digital coin 610 in response to the detected first input. For example, if the detected first input is determined to reflect a gentle flip, the physics engine 228 may result in constrained movements of the digital coin 610. The constrained movements of the digital coin 610 may increase the likelihood that the digital coin 610 lands within the target area 614. FIGS. 6D-6E illustrate that the output 616 of the physics engine 220 reflects an aggressive flip. For example, the detected first input may be compared to initial conditions maintained within the simulation data 226 and determined to reflect a large force and long duration of application of the force. Based on the simulation data 226, the output 616 may be applied to the movement of the digital coin 610. In FIG. 6E, the output 616 corresponding to an aggressive flip may direct the digital coin 610 towards the height 604a (labeled "Top Shelf"). FIG. 6F illustrates that the digital coin 610, in response to an aggressive flip to a height 404a, lands within the target location 614 and with the correct orientation. By correctly determining which side of the digital coin will land upright and ensuring that the coin lands at the desired location 614, the coin flip application 600 has been won.

FIG. 6F further indicates a credit or payout based the original wager and a multiplier associated with the height 604a (labeled "Top Shelf"). For example, multipliers may be included as part of the coin flip application 600. In order to implement one or more multipliers while maintaining an overall 50/50 chance of success, the inclusion of the target location 614 ensures that the multiplier is funded such that the odds of success are maintained within desired limit. In one example, if the digital coin 610 stays within the target location 614 such as a table, the odds of winning may be 50/50 based on the heads/tails guessed by the user. However, should the digital coin 610 fall off the table (i.e., land outside the target location 614) an onto another surface like the floor, the user would not win anything even if the coin lands as predicted. Unless both conditions are satisfied, the coin flip application 600 is not won and the user does not collect anything if the coin does not land on the table. In some example, the inclusion of the multiplier results in a game with odds that are not 50/50, as some results may lead to no win even if the correct landing side is predicted.

This change in winning odds then funds the multiplier sought. The multiplier may be introduced in the form of a multiplier that corresponds to the height at which the digital coin 610 is launched. The higher the coin is launched, the higher the multiplier offered to the user. As shown in FIG. 6A, multipliers may correspond to the heights or levels 604a-604c. If, for example, a 4× multiplier is offered to the user, they could win 4x their wager instead of the normal 2× their wager if the coin reaches the height 404c required, and the coin successfully lands on the table 614, and the coin lands on the predicted side of the coin (heads/tails). However, the higher height of the coin launch will lead to a higher risk of the coin bouncing off the table, and thus a resultant risk of no return to the user. The higher risk may reflect a perturbation or other increase in volatility introduced when a user attempts produce a flip to a higher level or height 604a-604c. Similarly, the perturbation may be experienced with a flip is made for accuracy across a distance. It will be understood that the perturbation increases the likelihood that the digital coin 610 misses the target surface 614 such as the surface of a table and lands on a losing surface, such as the floor.

In some examples, the coin flip application 600 may include a game space 602 configured to represent a variety of environments. For example, the game space 602 could be a tropical environment, a forest, a living room, a laundry room, or other place of interest. Each of the environments could be populated with different features or elements arranged at, for example, heights 604a-604c.

Figure 7:
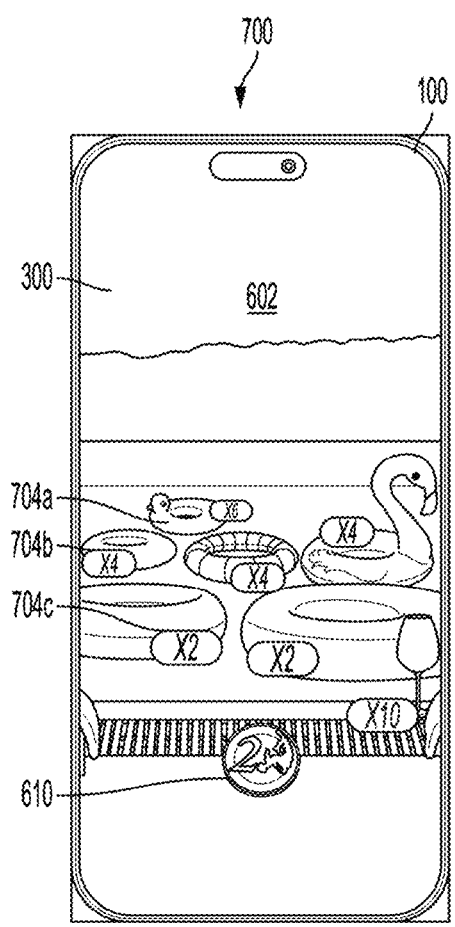
FIG. 7 illustrates another example embodiment of an alternate presentation of the application shown in FIGS. 6A, 6B, 6C, 6D, 6E, and 6F.
Figure 8:
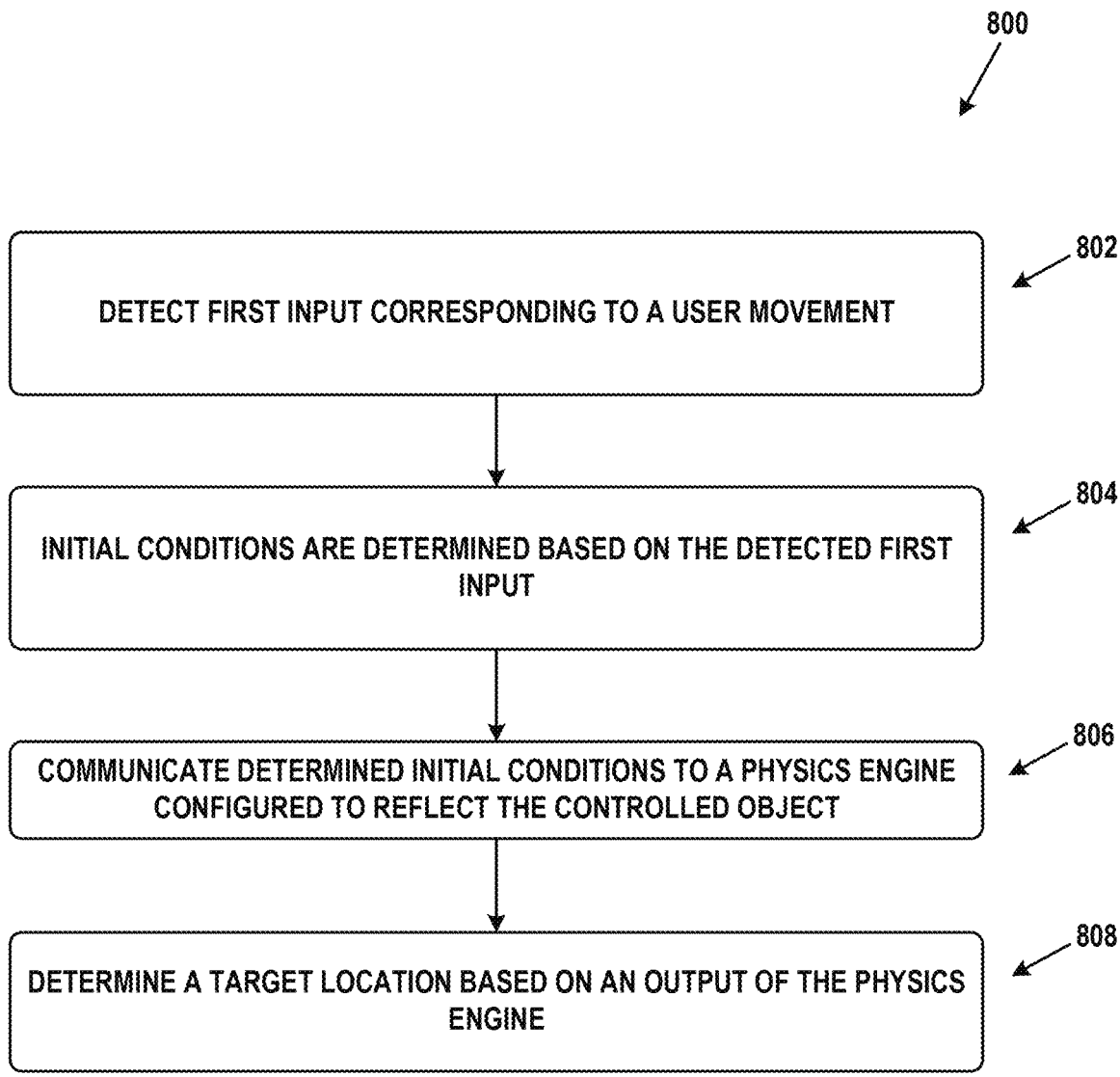
FIG. 8 is flowchart reflecting an example embodiment of a method for the capture of input conditions.

FIG. 7 illustrates an example of a bonus round or alternate game play 700 that includes multiple targets arranged at varying distances 704a-704c. In operations, the alternate game play may be accessed in response to predefined events such as accumulating a score, and hitting a specific target location. When the user flips a digital coin 610 to hit a target at distance 704a, the motion of the object may be affected perturbation providing variability such as wind affecting the flip. The amount of perturbation experienced may be a factor based on the distance 704a, 704b, or 704c, the bonus round, and/or the multiplier associated with a target location, FIG. 8 is flowchart 800 reflecting an example embodiment of a method for the capture of input conditions. The method shown in flowchart 800 may be stored or recorded as a series of executable steps and instructions on a non-transitory computer-readable medium. The method and corresponding executable instructions begin at block 802 by detecting a first input received by an input component. The first input may be provided using a mobile computing device, and other detection and recognition devices to identify in response to a user movement. At block 804, determining at least one initial condition based on the detected first input. At block 806, the at least one initial condition is communicated to a physics engine configured to reflect an object controlled by the input component. At block 808, a target location for the object is determined based on an output provided by the physics engine.

In one example a computing device is disclosed. The computing device includes an input component, a wireless communication module, and a processor and a memory in communication with input component and the wireless communication module wherein the processor is configured to execute instructions for an application stored in the memory. The application may include stored instructions executable to: detect a first input received by the input component, wherein the first input corresponds to a user movement; determine at least one initial condition based on the detected first input; communicate the at least one initial condition to a physics engine configured to represent an object controlled by the input component; and determine a target location for the object based on an output provided by the physics engine.

In another example a computing system is disclosed. The computing system includes an input component, a wireless communication module, one or more processors; and memory storing instructions for an application that are executable by the one or more processors. The stored instructions are executable to perform operations comprising: detecting a first input received by the input component, wherein the first input corresponds to a user movement; determining at least one initial condition based on the detected first input; communicating the at least one initial condition to a physics engine configured to represent an object controlled by the input component; and determining a target location for the object based on an output provided by the physics engine.

In another example a non-transitory computer-readable medium storing program instructions for an application that, when executed by one or more processors of a computing system, cause the computing system to perform operations. The non-transitory computer-readable medium including program instructions for: detecting a first input received by an input component, wherein the first input corresponds to a user movement; determining at least one initial condition based on the detected first input; communicating the at least one initial condition to a physics engine configured to represent an object controlled by the input component; and determining a target location for the object based on an output provided by the physics engine.

In some examples, an input component may be at least one of a touchscreen, a control stick, and one or more accelerometers.

In some examples, a wireless communication module may be configured for at least one of: wi-fi communication, peer-to-peer communication, and cellular communication.

In some examples, an initial condition may include at least one initial condition such as an X-component, a Y-component, a duration, and a vector.

In some examples, an object may be a drone in communication with the wireless communication module.

In some examples, an object may be a digital object displayed within a touchscreen of the input component, and wherein the object is configured as part of the physics engine.

In some additional examples, a target location may include a first target location and a second target location.

In some additional examples, an output provided by the physics engine may be adjusted by a perturbation that reflects either the first target location or the second target location.

In some additional examples, a first target location may be at a first height, and the second target location may be at a second height, and wherein the first height is lower than the second height.

In some additional examples, a magnitude of the perturbation increases based on the distance between the first target location, and the second target location.

In some additional examples, a first target location may be associated with a first probability and the second target location may be associated with a second probability.

In some examples, determining at the least one initial condition based on the detected first input reflects matching the first input to one of a plurality one initial condition maintained as part of the application.

In some examples, instructions stored as part of the application are executed continuously to provide an updated output.

In general, the path, angle, pressure, and speed of a swipe on a touchscreen can be converted into parameters for the physics engine to simulate a flip of the coin. For example, the path and angle may determine the coin's initial trajectory vector, while the pressure and speed may determine the coin's velocity or acceleration along this initial trajectory vector.

Other parameters may include the coin's properties (e.g., weight, size and shape, density, surface friction), the initial conditions of the coin (e.g., the initial velocity of its center of mass, a rate of the coin's spin around an axis, a wobble modeled by an offset axis or a non-linear axis), external forces (gravity pulling the coin downward or toward another body, air resistance), the positions, sizes, and collision dynamics (e.g., rigid, flexible, rubbery) of any obstacles that could be in the coin's path. The physics engine may take some or all of these parameters into account when determining the coin's route through a simulated environment (e.g., gravity slowly adjusts the coin's trajectory vector so that the coin follows an arc that possibly bounces one or more times off of various objects).

IV. CLOSING

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing device comprising:
   a touchscreen operating as an input component;
   a wireless communication module;
   a processor and a memory in communication with input component and the wireless communication module wherein the processor is configured to execute instructions for an application stored in the memory, the application includes stored instructions executable to:
   detect, by the touchscreen, a first input, wherein the first input corresponds to a user movement;
   determine, by the processor, at least one initial condition based on the detected first input;
   communicate, by the processor, the at least one initial condition to a physics engine configured to represent an object controlled by the first input to the touchscreen, wherein the physics engine utilizes the at least one initial condition and a perturbation that reflects either a first target location or a second target location; and
   determine, by the processor, a target location for the object based on an output provided by the physics engine, wherein the target location includes the first target location and the second target location.

2. The computing device of claim 1, wherein the input component further includes at least one of, a control stick, and one or more accelerometers.

3. The computing device of claim 1, wherein the wireless communication module is configured for at least one of: wi-fi communication, peer-to-peer communication, and cellular communication.

4. The computing device of claim 1, wherein the at least one initial condition includes: an X-component, a Y-component, a duration, and a vector.

5. The computing device of claim 1, wherein the object is a drone in communication with the wireless communication module.

6. The computing device of claim 1, wherein the object is a digital object displayed within the touchscreen of the input component, and wherein the object is configured as part of the physics engine.

7. The computing device of claim 1, wherein the output provided by the physics engine is adjusted by the perturbation to correspond to either the first target location or the second target location.

8. The computing device of claim 7, wherein the first target location is at a first height, and the second target location is at a second height, and wherein the first height is lower than the second height.

9. The computing device of claim 7, wherein a magnitude of the perturbation increases based on a distance between the first target location, and the second target location.

10. The computing device of claim 1, wherein the first target location is associated with a first probability and the second target location is associated with a second probability.

11. The computing device of claim 1, wherein determining at the least one initial condition based on the detected first input represents matching the first input to one of a plurality one initial condition maintained as part of the application.

12. The computing device of claim 1, wherein the instructions stored as part of the application are executed continuously to provide an updated output.

13. A computing system comprising:
a touchscreen operating as an input component;
a wireless communication module;
one or more processors; and
memory storing instructions for an application that are executable by the one or more processors to perform operations comprising:
 detecting, by the touchscreen, a first input, wherein the first input corresponds to a user movement;
 determining, by the processor, at least one initial condition based on the detected first input;
 communicating, by the processor, the at least one initial condition to a physics engine configured to represent an object controlled by the first input to the touchscreen, physics engine utilizes the at least one initial condition and a perturbation that reflects either a first target location or a second target location; and
 determining, by the processor, a target location for the object based on an output provided by the physics engine, wherein the target location includes the first target location and the second target location.

14. The computing system of claim 13, wherein the object is a digital object displayed within the touchscreen of the input component, and wherein the object is configured as part of the physics engine.

15. The computing system of claim 13, wherein the output provided by the physics engine is adjusted by the perturbation to correspond to either the first target location or the second target location.

16. A non-transitory computer-readable medium storing program instructions for an application that, when executed by one or more processors of a computing system, cause the computing system to perform operations comprising:
 detecting, by a touchscreen, a first input received by the touchscreen operating as an input component, wherein the first input corresponds to a user movement;
 determining, by the processor, at least one initial condition based on the detected first input;
 communicating, by the processor, the at least one initial condition to a physics engine configured to represent an object controlled by the first input detected by the touchscreen, physics engine utilizes the at least one initial condition and a perturbation that reflects either a first target location or a second target location; and
 determining a target location for the object based on an output provided by the physics engine, wherein the target location includes the first target location and the second target location.

17. The non-transitory computer-readable medium of claim 16, wherein the object is a digital object displayed within the touchscreen of the input component, and wherein the object is configured as part of the physics engine.

* * * * *